May 5, 1970
I. J. MELMAN
3,510,570
ELECTRONIC LENTICULAR DISPLAY SYSTEM
Filed Oct. 3, 1966
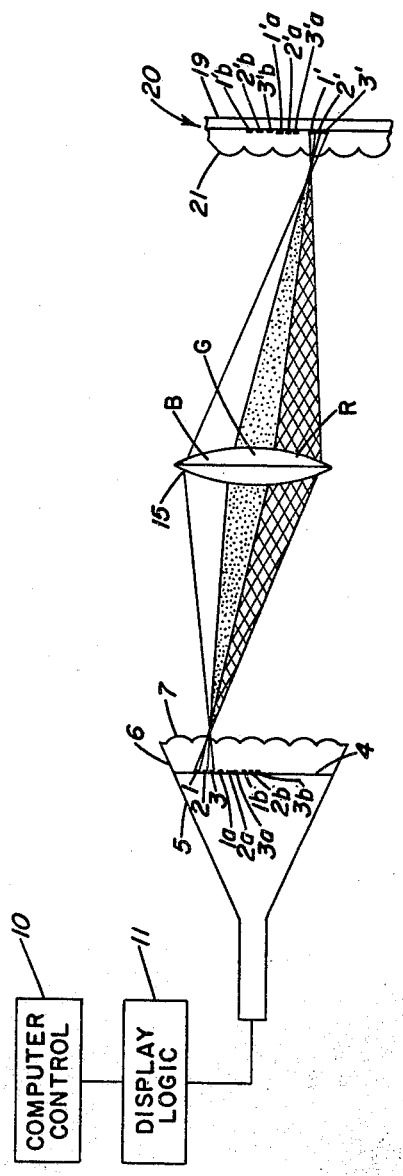
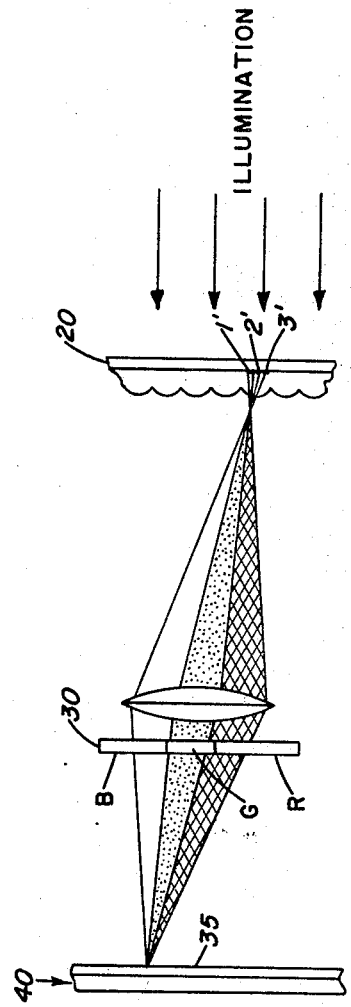
INVENTOR.
ISRAEL J. MELMAN
BY Ronald Zibelli
Stefan J. Klauber
ATTORNEY

United States Patent Office 3,510,570
Patented May 5, 1970

3,510,570
ELECTRONIC LENTICULAR DISPLAY SYSTEM
Israel J. Melman, Rochester, N.Y., assignor to Xerox Corporation, Rochester, N.Y., a corporation of New York
Filed Oct. 3, 1966, Ser. No. 583,635
Int. Cl. H04n 1/22
U.S. Cl. 178—5.4                                4 Claims

ABSTRACT OF THE DISCLOSURE

A recording system wherein a monochromatic cathode ray tube having a lenticulated face plate is utilized to display interlaced rasters of information each nominally color-identified and which are focused by a conventional lens means onto a photosensitive medium supported by a lenticulated support.

---

This invention relates to visual presentation of graphic information, and more particularly to presentation of such information by means of multi-colored displays in which given colors consistently represent particular classes of information.

The selective use of color in a visual presentation has long been recognized as an invaluable aid for increasing comprehension and speed of recognition of the material thereby presented. In the simplest hand-drawn charts, for example, a given color will often be chosen to represent a first parameter, a second and different color for another parameter and so forth. Where such simple schemes of data presentation are involved, colors may be thus introduced with relative simplicity. But where the data to be graphically presented is highly complex, and where the nature of such data requires constantly changing displays, the introduction of color coding is not so readily achieved.

One might, for example, consider the case of an optically projected display representative of positions and directions of movement of various aircraft within an airspace. While it is common to prepare a monochromatic display of such information, it would obviously be of enoromus utility to introduce into such displays various color codings to represent different classes of aircraft and/or differing directions of movement. Since, however, the type of information being considered changes almost from moment to moment, any method utilized must be capable not only of rapidly introducing the desired colored effects to begin with, but must readily lend itself as well to almost continuous updating and modification of the displayed information.

In the copending applications of Donald S. Cary, filed on Sept. 2, 1965, bearing Ser. Nos. 484,606 now U.S. Pat. No. 3,316,805 and 484,600 now U.S. Pat. No. 3,322,034, entitled, respectively, Color Display and Frost Color Display, and assigned to the same assignee as the present application, there are disclosed color display systems capable of fully meeting the criteria cited in the foregoing paragraph. The systems depicted in the referenced applications generally employ a technique wherein different, nominally color-identified portions of a monochromatic display are sequentially projected upon a light sensitive recording medium including a lenticular layer. The sequential display of monochromatic information is latently registered on interlaced portions of the light sensitive medium by means of a movable aperture plate positioned at the aperture of the recording lens, the movement of this aperture plate being coordinated with the display of successive portions of information. After development, the aperture plate is replaced by a color filter banded in accord with the nominal color identification of the several openings in the aperture plate, whereby projection of a light source through the imaged member provides the desired full color presentation.

The systems described in the foregoing patent applications while enormously simplifying the preparation of colored graphical displays, have in one respect been less than satisfactory. More specifically, a method has been long sought after for eliminating the mechanical element in the prior systems represented by the movable aperture plate utilized to define the separation images. This latter element not only introduces the usual bulk and speed limitations associated with moving mechanical elements, but in addition, requires considerable control circuitry, electric motors and so forth, to achieve the precise and exactly timed movement of the plate necessary to achieve synchronization with display of the separation images on the display tube face.

In accordance with the foregoing, it is an object of the present invention to provide apparatus and method for converting graphic information into a visual display having color characteristics in accordance with a preselected scheme for presentation of the information.

It is a further object of the invention to provide apparatus for utilization in conversion of monochromatic displays to full color displays by additive color synthesis in which the geometrical establishment of separation images at the lens aperture is achieved through purely electro-optical techniques.

It is a further object of the present invention to provide an apparatus of the type which synthesizes color displays from monochromatic displays via creation and subsequent projective combination of separation images on a lenticulated photorecptor in which the creation of such images is accomplished without intervening mechanical masks.

It is yet an additional object of the persent invention to provide an improvement in display systems of the type in which monochromatic displays on a cathode ray tube are converted to synthesized color displays via establishment and subsequent projective combination of separation images on a lenticulated photoreceptor, in which the mechanical aperture plate conventionally utilized therein to define geometrical separation is eliminated and replaced by a purely optical technique whereby not only is the speed and flexibility of the apparatus greatly increased but additionally light losses imposed by the intervening aperture plate are entirely eliminated.

Now in accordance with the present invention these objects and others not explicitly identified—but as will become apparent in the ensuing specification—are brought about through use of a lenticular imaging system wherein a lenticulated lens structure integrally formed on the face plate of the cathode ray display tube acts in a functional manner equivalent to the movable aperture plate of the prior art. More specifically, each individual lenticule of the face of the display tube is associated with a set of lines, each member of which constitutes a portion of a rastered, nominally color-identified separation image. Each lenticule acts in cooperation with other optical elements in the system to position the elementary lines comprising each such set at appropriate separation points on a spaced lenticular imaging member. The resulting nominally color-identified separation images on the photosensitive spaced member are then—as appropriate—developed. Full color viewing may thereafter be achieved in the conventional manner by positioning a banded color filter in the system and light projecting through the developed member, the filter, and onto a viewing screen.

A fuller understanding of the present invention, of the manner in which the invention achieves the objects previously recited, and of the inventions multiple advantages as compared to the prior art, may now best be gained by a reading of the following detailed specification, and by a simultaneous examination of the drawings appended hereto in which:

FIG. 1 diagrammatically illustrates a basic embodiment of the present invention; and FIG. 2 diagrammatically illustrates the manner in which a projection member prepared pursuant to the present invention is utilized for a full color display.

In FIG. 1 a monochromatic display source is illustrated as a cathode ray tube (CRT) 5. For purposes of concretely illustrating the manner in which the present invention operates, it may be assumed that the information displayed upon the face of the CRT comprises a pictorial representation of multiple aircraft operating within a geographically delimited air space. For limited durations of time ranging in the order of seconds to minutes, the visual presentation will accordingly be fixed and may consist of symbolic representations for the various aircraft such as circles, crosses, and the like, as well as of illuminated background demarkations indicating geographical boundary lines or physical features of the terrain underlying the air space. It may be assumed as well that differing classes of aircraft are under surveillance within the particular air space and that it is accordingly of considerable interest to introduce into the visual display some means of differentiating between these classes. Thus, for example, a given aircraft might be considered an "enemy," a second aircraft a "friend," a third aircraft might be considered "unknown" and so forth. Indicia may also be present in the monochromatic visual display indicating the direction of movement of the particular aircraft such as arrows attached to the locus of the aircraft, etc.

Control of the display upon the cathode ray tube 5 initiates at the computer control 10. The latter integrates inputs from various radar tracking stations or so forth and in turn supplies inputs to the display logic 11 which directly controls the visual presentation.

The cathode ray tube 5 is seen to be of generally conventional construction, except for the presence at the face plate 4 of the lenticular structure 6. The latter comprises a series of transverse cylindrical lens elements, is molded from plastic, glass, or other materials of appropriate light refracting characteristics, and is positioned or integrally formed at the face plate 4 of the CRT, where it acts in most respects like the lenticular structure present in the well known lenticular color film or the like. In FIG. 1, it is assumed that the thickness of face plate 4 is quite small so that the individual sweep lines are of the order of a radius of curvature away from the individual cylindrical lensing elements comprising lenticular structure 6. In this connection it may be noted that thicker plates can be utilized where they are of the design—well known in the art—which utilizes fiber optics integrally formed in the plate to "conduct" the lines to the outer surface thereof. The design of the lenticular structure 6 is such as to introduce lenticules in such numbers and arrangements that one is identifiable with each of the sweep lines appearing in each nominally color-identified CRT raster. In a typical instance, one such lenticule will accordingly be present—for reasons to be set forth subsequently—for a total of three paralleled sweep lines. In the same typical instance some five hundred such lenticules will be arranged side by side at the face plate of the CRT in order to achieve this same 3:1 lenticule to line ratio for the typical 1500 line pattern commonly utilized in CRT visual presentations.

In forming the color display, it may for illustration be assumed that nominally color-identified separation images are formed upon the face of the CRT5 under control of the coacting computer control 10 and the display logic 11. In a typical instance, three such separation images are sequentially displayed on successive raster patterns upon the CRT; however, unlike the case with the prior art, these images need not necessarily be time-separated, since spatial separation is already present at the display surface.

More specifically each raster is intentially displaced from the previous pattern by precisely one line. The three raster patterns are thus space interlaced regardless of whether their time of appearance on the screen differs from one another or not.

As previously indicated, the rasters conveying the several separation images are established upon the CRT in a typical case in such a manner that one lenticule will be provided for each set of three space adjacent lines corresponding to the three nominally color-identified images. The action of these lenticules is then such as to pass the entire bundle of rays emanating from each given member line from a set of three through a single specific portion of the lens 15. Thus, in FIG. 1 the individual lines at 1, 1a, 1b, etc., all form part of the raster pattern nominally color-identified as say "red." The action of each lenticule—such as 7—is then such as to direct the emanating ray bundles from these lines through a band-like portion of lens 15 indicated as R. It will be recognized by those skilled in the art that the action described is in effect precisely that which is accomplished in prior art systems by utilization therein of movable aperture plates placed before the lens 15. In the present instance then direction of the bundle through the selected portion of the lens is accomplished not by moving a mechanical aperture plate but rather by effecting mutual realtive displacement of the nominally color-identified images behind the lenticular layer 6. It may be noted hereto that not only has movement of the aperture plate been thus eliminated, but it will be observed as well that no masking down of the light emanating from any portions of the three images is involved. That is to say that all of the intensity present at any given point on any of the images is utilized in the imaging process.

With the aid of the foregoing, a simple illustration of the manner in which the present system is utilized may be given. Let us assume for this example that the radar tracking information being fed to the computer control 10 has identified three types of aircraft within the air space under surveillance. It is desired that the ultimate presentation to a viewing audience shall show the first class of aircraft as red, the second class is green, and the third class is blue. Although, as previously indicated, there is no necessity in the present instance for time sequentially presenting the color-identified material, we may for purposes of simplifying this example assume such an approach. Under such circumstances the signals fed by the computer control 10 are so encoded to display logic 11 that during a first period T1 the display upon the face of CRT5—which is monochromatic—comprises only showings of the class one aircraft. A picture displayed during this period T1 accordingly will be formed from a series of rastered sweep lines such as 1, 1a, 1b, 1c and so forth. Each such line is positioned uppermost with respect to two other such lines subsequently to be formed behind each individual lenticule such as lenticule 7.

Each lenticule such as 7 acts to image the lines 1, 1a, 1b, etc., at points on the light sensitive member 20 such as points 1′, 1′a, 1′b, etc. It will be noted that the bundle of rays derived from each of these lines 1, 1a, etc., pass through a specific limited band-like portion of the projector lens 15 such as that banded section of the lens 15 identified as R. Clearly it is intended that all such ray bundles be nominally color-identified as red.

At the end of period T1, a second nominally color-identified picture is established upon the face of CRT5 and composed of the various sweep lines as 2, 2a, 2b and so forth. In the same manner as was indicated for the first period T1, this second set of lines images at points on the photosensitive member 20 such as 2′a, 2′b, etc. Again, it will be noted that the ray bundles emanating from the set of lines composing this second picture have all been passed through the lenticules comprising structure 6 in such a manner that each bundle passes through the single specific portion of the lensing structure 15 identified as G.

Clearly it is intended that all such ray bundles be nominally color-identified as green.

During the following period T3 a third picture is established upon the face of CRT5 now comprising the raster including lines 3, 3A, 3B, etc. In precisely the same manner as indicated for the first two patterns imaging occurs on the photosensitive member 20 at points such as 3'a, 3'b, etc. and given bundles of rays pass through the third portion of the lens identified now by the designation B. Again, it should be obvious that all such ray bundles are intended to be nominally color-identified as blue.

It will be recognized by those skilled in the art that the exposure technique herein described is closely analogous to that disclosed in the Cary systems previously alluded to. However, geometrical displacement of the separation images at the lens aperture has now been accomplished completely by electro-optical means imposed at the CRT5 rather than by a movable plate.

As a result of the interlaced image displays formed upon the CRT5 a latent image comprising an interlaced pattern of the "red," "blue," and "green" separation images is now present on member 20, and may be developed for subsequent full color projection. The member 20 is shown for sake of simplicity as being the simple photographic member well-known to the art of lenticular color photography and including the lenticular layer 21 and the photosensitive layer 19. In a typical instance, however, the photoreceptor may comprise instead a three layered xerographic plate such as is depicted and set forth in the Cary 484,606 application previously alluded to. In that instance the photosensitive layer 19 is replaced by an adjacent, transparent, conductive layer in turn overcoated with a transparent photoconductor. In the 484,600 application of Cary—also alluded to—a further refinement was introduced by way of a photosensitive layer including as the imaging portion thereof a frostable photoreceptor having light recording properties in accord with similar members described in the Gunther and Gundlach Pat. 3,196,011. Advantages may be derived in the present invention by use of these type of members in accord with the Cary disclosure by virtue of the reusability and erasability characteristics present in such materials. Particular advantages may arise further where a frostable photoreceptor is used since as was pointed out in the Cary 484,600 application such member is particularly advantageous in subsequent viewing in that its light absorbtion characteristics are much lower than a conventional silver haloid emulsion.

In any event the member 20 once developed will in each instance be projected by a similar and well known technique such as is depicted in FIG. 2. The projection method is the standard one utilized for projection of lenticular color members, a banded filter as at 30 being now positioned to synthesize in accordance with the principles of additive color photography color images on the screen 40. In accordance with the technique by which the various separation images were deposited representative points such as 1' thus pass through the red (R) portion of the filter 30, points nominally color-identified as green, such as for example point 2' pass through green (G) portions of the filter 30 and points nominally color-identified as blue such as 3' pass through blue portions (B) of the banded filter. It should be noted that the adjacent line images on 20 behind each lenticule—such as the lines including points 1', 2', and 3'—now image on the screen 40 in register. For example point 35 lies on the common registration line for the three lines including points 1', 2', and 3'. This is to say that the three separation images originally displayed on CRT5, upon final projection appear in common register on the viewing screen. This, of course, means that one not only may by the technique set forth display the primary colors such as red, green and blue from the monochromatic nominally color identified rastered patterns on CRT5, but one may as well display any colors whatsoever of the spectrum by proper combinations of the primary components. It may be noted in this same connection that even if all three lines are not completely superimposed at point 35, the adjacent resolution elements are small enough that the eye viewing the pattern on screen 40 will integrate the three primary colors to give the original color.

While the present invention has been described in terms of specific embodiments thereof it will be understood in view of the instant disclosure that numerous variations thereon and modifications thereof may now be readily devised by those skilled in the art without yet departing from the present teaching. Accordingly, the present invention is to be construed broadly and limited in scope only by the claims now appended hereto.

What is claimed is:

1. Filterless apparatus for transforming a monochromatic graphic display into separation images on a lenticulated photoreceptor suitable for subsequent full color projection comprising:
   (a) cathode ray tube display means
   (b) projection lensing means positioned between said display means and said lenticulated photoreceptor and adapted to image light rays from said display means behind individual lenticules on said photoreceptor
   (c) display logic electrically connected to said display means and adapted to produce nominally color identified separation images on spatially interlaced rasters on the face of said tube and
   (d) lenticular lensing means positioned at the face plate of said CRT display means and adapted to direct lines comprising said rasters only through projection lensing means in accord with the nominal color identification of the raster with which said lines are associated.

2. Filterless apparatus for transforming a monochromatic graphic display into separation images on a lenticulated photoreceptor suitable for subsequent full color projection comprising:
   (a) cathode ray tube display means;
   (b) projection lensing means positioned between said display means and said lenticulated photoreceptor;
   (c) display logic electrically connected to said display means and adapted to produce nominally colored identified separation images on spatially interlaced rasters on the face of said tube; and
   (d) lenticular lensing means positioned at the face plate of said CRT display means and adapted to image the raster lines composing said separation images only through said projection lensing means and onto said lenticulated photoreceptor at positions behind individual lenticules on said photoreceptor corresponding with the positions of said interlaced lines behind individual lenticules on said display means face plate.

3. Filterless apparatus for transforming a monochromatic graphic display into separation images on a lenticulated photosensitive member for subsequent full color projection comprising:
   (a) cathode ray tube display means having a face plate including a plurality of parallel lenticular lenses;
   (b) display logic means for establishing rastered interlaced separation images of said monochromatic graphic display, said images being nominally color-identified with one primary color each, said interlaced rasters being of such spatial frequency as to associate one line corresponding to each of said primary colors with one each of said lenticules;
   (c) a lenticulated photosensitive member positioned to receive images formed on the face of said CRT; and
   (d) an optical path defined by said face plate and said photosensitive member consisting of a lensing assembly adapted to image sets of interlaced raster lines behind individual lenticules upon said CRT display means as corresponding sets of lines behind individual lenticules upon said photosensitive member, said lensing assembly being the only component intermediate said display means and said photosensitive member.

4. In a filterless display system of the type adapted to transform a monochromatic graphic display into a corresponding graphic display colored in accord with a preselected scheme and including monochromatic display means adapted to display differing portions of said monochromatic display as nominally color identified images and means for geometrically separating and recording said images on a lenticulated photosensitive member for subsequent development and projection through a banded color filter achieves said colored display, the improvement wherein said means for geometrically separating said images includes electrical means for establishing said images upon said display means on nominally color-identified interlaced raster patterns behind a lenticulated structure adapted to cooperate solely with spaced lensing means so as to direct light rays emanating from each of said rastered images only through portions of said lensing means nominally color identified with the same color as the image, and onto said lenticulated photosensitive member.

References Cited

UNITED STATES PATENTS

| | | | |
|---|---|---|---|
| 2,479,820 | 8/1949 | De Vore | 178—5.2 |
| 2,600,868 | 6/1952 | Hales. | |
| 2,638,498 | 5/1953 | De France et al. | |
| 2,764,629 | 9/1956 | Goldmark. | |
| 2,807,737 | 9/1957 | Wright | 178—5.4 XR |
| 2,912,488 | 11/1959 | Smith et al. | 178—6.7 XR |
| 3,299,203 | 1/1967 | Gil de Gibaja | 178—5.4 |

ROBERT L. GRIFFIN, Primary Examiner

R. P. LANGE, Assistant Examiner

U.S. Cl. X.R.

178—6.7, 15; 350—167